(12) United States Patent
Hoy

(10) Patent No.: US 7,524,153 B2
(45) Date of Patent: Apr. 28, 2009

(54) ANCHORING PRODUCTS AND METHODS OF SUCH PRODUCTS

(76) Inventor: Kevin Douglas Hoy, Fieldfaree, Kings Ash, Great Missenden, Buckinghamshire, HP19 SNP (GB)

( * ) Notice: Subject to any disclaimer, the term of this patent is extended or adjusted under 35 U.S.C. 154(b) by 118 days.

(21) Appl. No.: 10/581,432

(22) PCT Filed: Dec. 3, 2004

(86) PCT No.: PCT/GB2004/005069

§ 371 (c)(1),
(2), (4) Date: Jun. 2, 2006

(87) PCT Pub. No.: WO2005/054692

PCT Pub. Date: Jun. 16, 2005

(65) Prior Publication Data

US 2007/0134972 A1     Jun. 14, 2007

(30) Foreign Application Priority Data

Dec. 3, 2003    (GB) .................................. 0328043.5

(51) Int. Cl.
*F16B 37/04*    (2006.01)
(52) U.S. Cl. .................... 411/108; 411/82; 411/172; 52/745.21
(58) Field of Classification Search ............... 411/108, 411/82, 82.3, 930; 29/525.01, 525.02, 525.04, 29/525.11, 525.12, 525.13, 525.15, 897.32; 52/704, 707, 745.21
See application file for complete search history.

(56) References Cited

U.S. PATENT DOCUMENTS 1,433,621 A * 10/1922 Hutton ......................... 52/166
1,940,545 A * 12/1933 Holmes ........................ 52/699
2,400,318 A *  5/1946 Rosan ......................... 411/373
2,754,882 A *  7/1956 Rosan ......................... 411/108
2,972,730 A *  2/1961 Abrams ....................... 439/389
3,019,865 A    2/1962 Rohe
3,030,705 A *  4/1962 Gill .......................... 29/525.11
3,468,358 A *  9/1969 Neuschotz .................... 411/108
3,534,797 A * 10/1970 Haug et al. .................. 411/108
3,640,327 A *  2/1972 Burt .......................... 411/108
3,646,982 A *  3/1972 Cushman .................... 411/82.5

(Continued)

FOREIGN PATENT DOCUMENTS

EP    0 818 631  A2    1/1998

(Continued)

*Primary Examiner*—Victor Batson
*Assistant Examiner*—Roberta Delisle
(74) *Attorney, Agent, or Firm*—Davis & Bujold, P.L.L.C.

(57) ABSTRACT

A fastener-fitting (1) for a bolt (10) is anchored to a mineral slab (2) by cutting a cavity (5) into the slab (2) and trapping an elongate flanged-base (4) of the fastener (1) in the cavity (5) under a plug-element (8) of the slab-mineral. The flanged-base (4) fits within a conformal recess (15) in the underside (14) of the plug-element (8) to hold the fastener (1) against turning, with an internally-threaded tubular portion (3) of the fastener (1) extending through a bore (9) of the plug-element (8) for receiving the bolt (10) clamping an item (11) to the slab (2). The plug-element (8) is retained in the cavity (5) by adhesive, and has channels (20,21) for dispersal of surplus adhesive from the cavity (5).

10 Claims, 2 Drawing Sheets

U.S. PATENT DOCUMENTS

Figure 1:
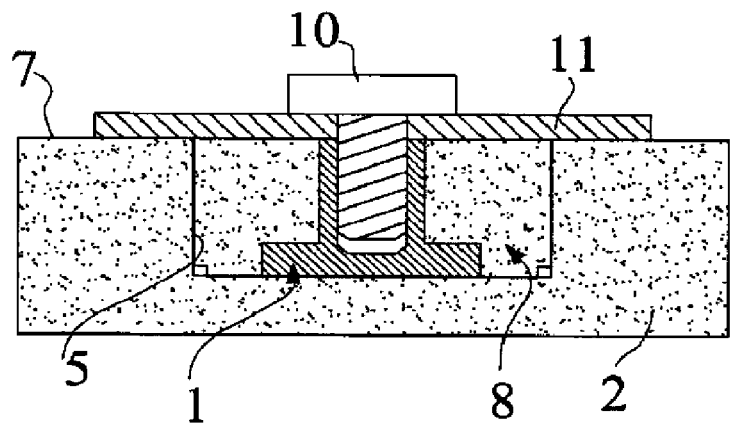

| | | |
|---|---|---|
| 3,716,092 A | 2/1973 | Serewicz |
| 3,765,464 A * | 10/1973 | Hasegawa .................... 411/108 |
| 4,102,030 A * | 7/1978 | King, Jr. ..................... 29/458 |
| 4,408,940 A * | 10/1983 | Fischer ........................ 52/704 |
| 4,464,091 A * | 8/1984 | Molina ....................... 411/105 |
| 4,520,601 A * | 6/1985 | Stacey, Jr. ................. 52/127.7 |
| 4,587,705 A * | 5/1986 | Ruck et al. .................... 29/450 |
| 4,817,264 A * | 4/1989 | Worthing ..................... 29/512 |
| 5,110,244 A * | 5/1992 | Garman ....................... 411/361 |
| 5,221,169 A * | 6/1993 | McSherry et al. ........... 411/344 |
| 5,263,804 A * | 11/1993 | Ernst et al. .................... 411/82 |
| 5,347,777 A * | 9/1994 | Sudduth ................. 52/223.13 |
| 5,378,099 A | 1/1995 | Gauron |
| 5,483,781 A * | 1/1996 | Ernst et al. .................... 52/698 |
| 5,941,669 A | 8/1999 | Aukzemas |
| 6,079,179 A * | 6/2000 | Shoemaker, Jr. ............. 52/699 |
| 2001/0032435 A1 * | 10/2001 | Austin ..................... 52/749.12 |

FOREIGN PATENT DOCUMENTS

| | | |
|---|---|---|
| EP | 1 024 304 A1 | 1/2000 |
| FR | 2 432 635 | 2/1980 |
| GB | 876106 | 8/1961 |
| GB | 1 343 824 | 1/1974 |

* cited by examiner

ANCHORING PRODUCTS AND METHODS OF SUCH PRODUCTS

This invention relates to methods of anchoring fittings, and the products of such methods.

The anchoring of a fitting such as, for example, the fastening required for a bolt used to clamp an item to a base member, is commonly carried out by drilling a hole in the base member and inserting a threaded boss of metal or plastics into the hole for retention there as a tight fit. This method, however, has not proved satisfactory where the base member is of certain mineral compositions in that cracking of the mineral material may result and the boss is prone to pull out. Although adhesives for such material may be available, they are not generally effective for bonding metal or plastics material to them.

It is an object of the present invention to provide a method, and the product of such method, by which this and similar anchoring problems can be to a large extent overcome.

According to one aspect of the present invention a method of anchoring a fitting to a base member comprises forming a cavity in the base member, the cavity opening from a surface of the base member, locating at least a part of the fitting within the cavity, and entering a plug-element having a bore therethrough into the cavity for retention within the cavity, the plug-element when entered into the cavity plugging the cavity-opening to trap said part of the fitting within the cavity with a portion of said part in register with said bore.

According to another aspect of the present invention there is provided a fitting anchored to a base member, wherein at least a part of the fitting is located within a cavity that opens from a surface of the base member, and a plug-element having a bore therethrough is retained within the cavity, the plug-element plugging the cavity-opening to trap said part of the fitting within the cavity with a portion of said part in register with said bore.

The fitting of both aspects of the invention may be a fastener for use in clamping or otherwise securing an item to the surface of the base member. The fitting may be, for example, a screw-threaded nut, having a screw thread aligned with the bore for engagement by a screw-threaded bolt, rod or other member inserted in the bore, for securing the item to the base member. It may, however, have an internally-threaded tubular portion that projects into the bore from under the plug-element; the tubular portion may extend the length of the bore to open at the surface of the base member, but may alternatively extend sufficiently to project beyond this. As an alternative, the fitting, whether for use as a fastener or otherwise, may involve a rod or other component that extends via the bore to project from the surface.

A base of the fitting may be located on the bottom of the cavity under the plug-element, and this and the underside of the plug-element may be engaged with one another to restrain the fitting from turning relative to the plug-element. In this regard, the underside of the plug-element may be recessed, and the base of the fitting may be a flange that is inset within the recess when the plug-element is entered into the cavity. The flange may be of an elongate configuration and the recess may then be of a substantially conformal configuration for restraining the fitting from turning relative to the plug-element.

The plug-element may be retained within the cavity by adhesive, and may be of the same material as the base member.

The base member, which, for example, may be in a sheet or slab form, may be of natural mineral or of a man-made mineral material having a composition containing natural mineral particles in acrylic resin.

The fitting and the plug-element may be marketed in combination with one another for use in the provision of an anchored fitting in accordance with the invention.

Figure 2:
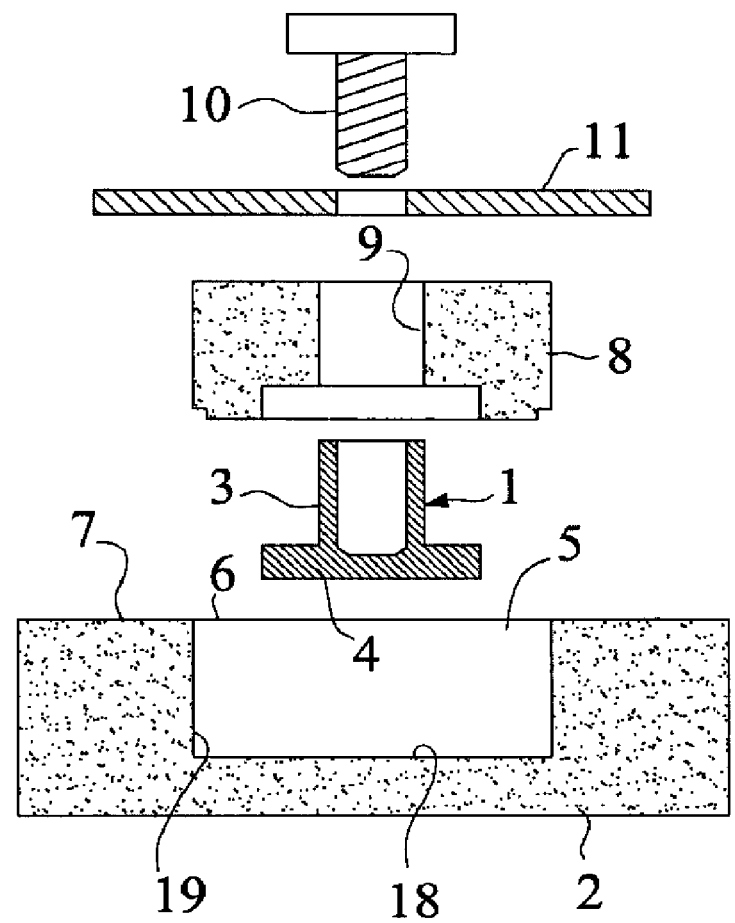
Figure 3:
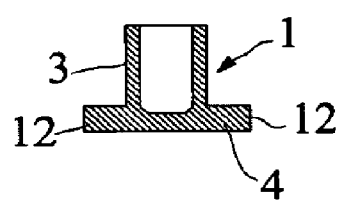
Figure 5:
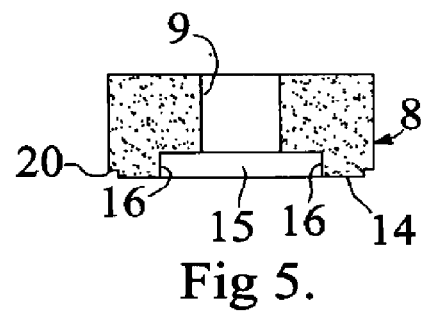
Figure 4:
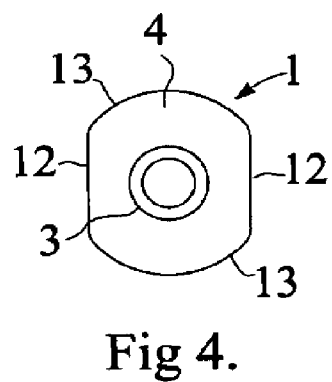
Figure 6:
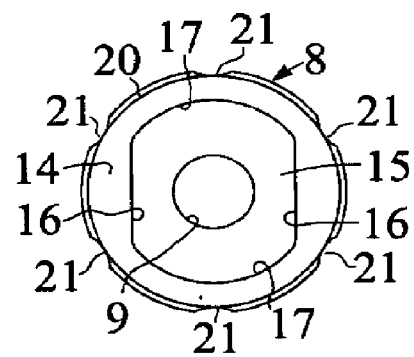

A method of anchoring a fitting in a slab member, and the slab member with an anchored fitting as a product of the method, in accordance with the present invention, will now be described, by way of example, with reference to the accompanying drawing, in which:

FIGS. 1 and 2 are, respectively, a sectional side-elevation and an exploded sectional view showing a fitting anchored to a slab base-member, according to the invention;

FIGS. 3 and 4 are, respectively, a sectional side elevation and a plan view from above of the anchored fitting of the arrangement of FIGS. 1 and 2; and FIGS. 5 and 6 are, respectively, a sectional side elevation and a plan view from below of a plug-element used in combination with the fitting of FIGS. 3 and 4 for anchoring as illustrated in FIG. 1.

The method and product of the method, to be described, involve the anchoring of a metal (or plastics) fastener in a slab member of a man-made mineral material that has a composition containing natural mineral particles in acrylic resin. In particular, the material of the slab member is a solid non-porous surfacing material which is homogeneously composed of one-third polymethyl methacrylate and two-thirds natural minerals with mineral aluminium trihydrate derived from bauxite as a main component, and which is sold under the Registered Trade Mark CORIAN by E.I DuPont de Nemours and Co.

The anchoring of a fastening to such material has previously been carried out by drilling a hole in the material and inserting a threaded boss of brass or nylon into the hole for retention there as a tight fit. This has not proved satisfactory, in that cracking of the man-made material may result and the boss is prone to pull out. Although adhesive for bonding the mineral material to itself is available, this is not effective for bonding metal or plastics material to it. The method and the product of the method, according to the invention, overcome these problems to provide strong anchoring.

Referring to FIGS. 1 and 2, a stainless-steel fastener 1 is in this case anchored in the slab member 2 of the man-made mineral material. The fastener 1 has (as indicated most clearly in FIG. 2) an internally-threaded tubular portion 3 that is upstanding from a flanged-base 4, and is located within a respective cylindrical-cavity 5 in the member 2. The cavity 5 has an opening 6 in a face 7 of the slab member 2, and this opening 6 is plugged within the cavity 5 substantially flush with the face 7, by a cylindrical element 8 of the same material as the member 2. The tubular portion 3 of the fastener 1 is located within a central bore 9 of the element 8 to extend the length of the bore 9 and open substantially flush with the face 7.

The element 8 is bonded in the cavity 5 using an appropriate adhesive for bonding the man-made mineral material to itself; an appropriate adhesive is that sold as "Joint Adhesive for DuPont CORIAN" under the Registered Trade Marks DUPONT and CORIAN, by E.I DuPont de Nemours and Co. With the bonding of the element 8 in this way, the flanged-base 4 of the fastener 1 is securely trapped in its cavity 5 and, as illustrated in FIGS. 1 and 2, may be engaged by a screw-bolt 10 to clamp a fitment 11 to the face 7 of the member 2.

Further details of the fastener 1 and element 8, in particular the way in which the fastener 1 is restrained from turning within its cavity 5, and bonding of the element 8 is facilitated, will now be described with reference to FIGS. 3 to 6.

Referring to FIGS. 3 and 4, the fastener 1 is of one-piece construction, with its flanged-base 4 of elongate configuration having straight, parallel sides 12 and rounded ends 13. As shown in FIGS. 5 and 6, the underside 14 of the element 8 has a recess 15 that is to the same elongate configuration so that it receives the flanged-base 4 inset therein. More especially, the recess 15 has straight, parallel sides 16 and rounded ends 17 conforming to the sides 12 and ends 13 respectively.

Accordingly, the method of assembly with anchoring of the fastener 1 within the slab member 2 can be readily carried out, once the appropriate cavity 5 has been drilled, simply by first bringing the fastener 1 towards the underside 14 of the element 8 with the tubular portion 3 in register with the bore 9 within the recess 15. The fastener 1 is now closed onto the underside 14 to extend the portion 3 the full length of the bore 9 and inset the flanged-base 4 within the recess 15. Abutment of the sides 12 with the sides 16 in this assembly precludes turning of the fastener 1 relative to the element 8.

The assembled fastener 1 and element 8 are now inserted into the cavity 5 to bring the flanged-base 4 down into abutment with the bottom 18 of the cavity 5, after a film of the appropriate adhesive has been deposited on the bottom 18 and side wall 19 of the cavity 5 (FIG. 2). The underside 14 of the element 8 is cut away to leave a peripheral channel 20 with interconnected axially-extending surface channels 21 for dispersal of surplus adhesive (FIGS. 5 and 6).

In one application of the invention a slab corresponding to the slab 2 forms a door to a kitchen cabinet, and a bracket of a hinge is clamped to the back face of the slab using four screw-bolts. Each screw-bolt is engaged tightly with a fastener corresponding to the fastener 1, as used in combination with a plug-element corresponding to the element 8, for anchoring the fastener firmly to the slab.

The invention claimed is:

1. A fitting anchored to a base member of a mineral composition, wherein the fitting has a base and a threaded portion upstanding from the base, the base member has a surface and a cylindrical cavity that opens from the surface of the base member and has a bottom surface, the cylindrical cavity has a diameter and a depth, a cylindrical plug-element of said mineral composition is located within the cylindrical cavity, the cylindrical plug-element having a top and an underside and having a diameter and a thickness substantially the same as the diameter and depth respectively of the cylindrical cavity for close-fit location within the cylindrical cavity with the top of the plug-element substantially flush with the surface of the base member and the underside of the plug-element abutting the bottom surface of the cavity, adhesive film within the cylindrical cavity for retaining the cylindrical plug-element within the cylindrical cavity with the top of the cylindrical plug-element substantially flush with the surface of the base member and the underside of the plug-element abutting the bottom surface of the cavity, the underside of the cylindrical plug-element has a recess therein, and wherein the fitting is trapped in the cylindrical cavity under the plug-element with its threaded portion extending lengthwise of the axial bore through the plug-element and its base engaged in the recess in the underside of the plug-element for precluding movement of the fitting relative to the plug-element.

2. The fitting anchored to a base member of mineral composition, according to claim 1, wherein the threaded portion of the fitting is an internally-threaded tubular portion.

3. The fitting anchored to a base member of mineral composition, according to claim 2, wherein the tubular portion extends the length of the axial bore of the plug-element to open at said surface of the base member.

4. The fitting anchored to a base member of mineral composition, according to claim 3, wherein the base of the fitting is of an elongate configuration and the recess in the underside of the cylindrical plug-element has a configuration conformal with the elongate configuration of the base of the fitting for restraining the fitting from turning relative to the cylindrical plug-element.

5. The fitting anchored to a base member of mineral composition, according to claim 1, wherein the cylindrical plug-element has channels therein for dispersing adhesive from the cavity.

6. A method of anchoring a fitting to a base member of a mineral composition, the method comprising the steps of:
   forming a cylindrical cavity in the base member to open from a surface of the base member, the cavity having a bottom surface,
   providing a cylindrical plug-element of said mineral composition having a top and an underside, the plug-element having a diameter and thickness substantially the same as the diameter and depth respectively of the cavity and having an axial bore therethrough,
   providing a fitting having a base and a threaded portion upstanding from the base,
   inserting the fitting into the underside of the plug-element with the threaded portion of the fitting extending lengthwise of the bore of the plug-element and the base of the fitting engaged in a recess in the underside of the plug-element for precluding movement of the fitting relative to the plug-element, and
   after the fitting has been inserted into the plug-element as aforesaid, entering the plug-element into the cavity for close-fit retention therein by adhesive film with the top of the plug-element substantially flush with said surface of the base member and the underside of the plug-element abutting the bottom surface of the cavity to trap the fitting within the cavity under the plug-element.

7. The method according to claim 6, further comprising the step of forming the threaded portion of the fitting as an internally-threaded tubular portion.

8. The method according to claim 7, further comprising the step of extending the tubular portion the length of the bore of the plug-element so as to open at said surface of the base member.

9. The method according to claim 6, further comprising the step of forming the base of the fitting as an elongate configuration and forming the recess as a substantially conformal configuration for restraining the fitting from turning relative to the plug-element.

10. The method according to claim 6, further comprising the step of supplying adhesive in the cavity before the step of entering the plug-element into the cavity, and dispersing surplus adhesive from the cavity via channels in the plug-element.

* * * * *